United States Patent
Kim et al.

(10) Patent No.: US 10,579,256 B2
(45) Date of Patent: Mar. 3, 2020

(54) DISPLAY OPERATING METHOD AND ELECTRONIC DEVICE SUPPORTING THE SAME

(71) Applicant: Samsung Electronics Co., Ltd, Suwon-si (KR)

(72) Inventors: So Young Kim, Suwon-si (KR); Shi Yun Cho, Anyang-si (KR); Wan Ho Roh, Seoul (KR); Min Sik Kim, Yongin-si (KR); Jong Moo Lee, Seoul (KR); Geon Soo Kim, Suwon-si (KR); Jin Wan An, Daegu (KR); Ji Woo Lee, Gumi-si (KR); Hyun Suk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 15/802,372

(22) Filed: Nov. 2, 2017

(65) Prior Publication Data
US 2018/0121078 A1    May 3, 2018

(30) Foreign Application Priority Data
Nov. 2, 2016   (KR) .................. 10-2016-0145382

(51) Int. Cl.
*G06F 3/0488*   (2013.01)
*G06F 3/0484*   (2013.01)
(Continued)

(52) U.S. Cl.
CPC .......... *G06F 3/04883* (2013.01); *G06F 3/016* (2013.01); *G06F 3/0416* (2013.01);
(Continued)

(58) Field of Classification Search
CPC .... G06F 3/0488; G06F 3/016; G06F 3/04883; G06F 3/04845
See application file for complete search history.

(56) References Cited

U.S. PATENT DOCUMENTS

| 9,244,562 B1 | 1/2016 | Rosenberg et al. |
| 2006/0197753 A1 | 9/2006 | Hotelling |

(Continued)

FOREIGN PATENT DOCUMENTS

| KR | 1020110116712 A | 10/2011 |
| KR | 20140019531 A | 2/2014 |

(Continued)

OTHER PUBLICATIONS

International Search Report dated Mar. 23, 2018 in connection with International Patent Application No. PCT/KR2017/012360.
(Continued)

*Primary Examiner* — Abbas I Abdulselam

(57) ABSTRACT

An electronic device is disclosed which includes a housing including a first surface facing in a first direction and a second surface facing in a second direction that is opposite to the first direction, a display disposed between the first surface and the second surface, at least a part of the display being exposed through the first surface, a pressure sensor disposed between the display and the second surface and detecting pressure of an external object applied on the display, and a processor electrically connected with the display and the pressure sensor. If a touch input of a specified pressure intensity or more is made by the external object in any region on the display, the processor activates at least one virtual function key operating in common with respect to any screens to be displayed in the display.

20 Claims, 12 Drawing Sheets

(51) Int. Cl.
    *G06F 3/041*     (2006.01)
    *G06F 3/0482*    (2013.01)
    *G06F 3/0481*    (2013.01)
    *G06F 3/01*      (2006.01)

(52) U.S. Cl.
    CPC .......... *G06F 3/0482* (2013.01); *G06F 3/0488* (2013.01); *G06F 3/04817* (2013.01); *G06F 3/04845* (2013.01); *G06F 3/04886* (2013.01); *B32B 2457/208* (2013.01); *G06F 2203/04105* (2013.01); *G06F 2203/04803* (2013.01); *G06F 2203/04804* (2013.01); *G06F 2203/04808* (2013.01)

(56) References Cited

U.S. PATENT DOCUMENTS

| | | | |
|---|---|---|---|
| 2010/0128002 | A1 | 5/2010 | Stacy et al. |
| 2011/0007023 | A1* | 1/2011 | Abrahamsson ..... G02F 1/13338 345/174 |
| 2011/0018695 | A1 | 1/2011 | Bells et al. |
| 2013/0307788 | A1 | 11/2013 | Rao et al. |
| 2014/0101576 | A1* | 4/2014 | Kwak ................. G06F 3/0482 715/761 |
| 2014/0152576 | A1* | 6/2014 | Kim .................... G06F 3/03545 345/169 |
| 2014/0289668 | A1 | 9/2014 | Mavrody |
| 2015/0153893 | A1* | 6/2015 | Park ....................... G06F 3/0488 345/173 |
| 2015/0309657 | A1* | 10/2015 | Park ....................... G06F 3/0412 345/173 |
| 2015/0365306 | A1 | 12/2015 | Chaudhri et al. |
| 2016/0162111 | A1 | 6/2016 | Pechanec et al. |
| 2016/0162112 | A1 | 6/2016 | Lee et al. |
| 2016/0378277 | A1* | 12/2016 | Cho .................. H04M 1/72583 715/814 |
| 2017/0116451 | A1* | 4/2017 | Jiang ..................... G06K 9/0002 |

FOREIGN PATENT DOCUMENTS

| | | |
|---|---|---|
| KR | 20140118664 A | 10/2014 |
| KR | 10-2015-0044643 A | 4/2015 |
| KR | 10-2016-0020747 A | 2/2016 |

OTHER PUBLICATIONS

Supplementary European Search Report dated Jul. 30, 2019 in connection with European Patent Application No. 17 86 8251, 14 pages.

* cited by examiner

DISPLAY OPERATING METHOD AND ELECTRONIC DEVICE SUPPORTING THE SAME

CROSS-REFERENCE TO RELATED APPLICATION(S)

The present application is related to and claims the benefit under 35 U.S.C. § 119(a) to Korean Patent Application No. 10-2016-0145382 filed Nov. 2, 2016, the entire disclosure of which is hereby incorporated by reference.

TECHNICAL FIELD

The present disclosure relates to a technology for operating a touchscreen display of an electronic device.

BACKGROUND

As an electronic device includes more functions, the area of a display needed to operate the functions becomes larger. For example, there is the introduction of a zero bezel technology for making the area of the display wide by removing elements such as a physical key from a bezel region.

SUMMARY

A large area display causes inconvenience in user manipulation. For example, the large area display makes the ability to manipulate the electronic device with one hand low, thus accompanying the other hand excepting for a hand gripping the electronic device.

Various embodiments of the present disclosure provides a display operating method capable of activating and using function keys associated with operating an electronic device by performing an input operation on a touchscreen display without regard to a specific region and the electronic device supporting the same.

In accordance with an aspect of the present disclosure, an electronic device may include a housing including a first surface facing in a first direction and a second surface facing in a second direction that is opposite to the first direction, a display disposed between the first surface and the second surface, at least a part of the display being exposed through the first surface, a pressure sensor disposed between the display and the second surface and detecting pressure of an external object applied on the display, and a processor electrically connected with the display and the pressure sensor.

According to an embodiment, if a touch input of a specified pressure intensity or more is made by the external object in any region on the display, the processor activates at least one virtual function key operating in common with respect to any screens to be displayed in the display.

According to various embodiments, it may be possible to allow the user to manipulate an electronic device conveniently by easily controlling a function of the electronic device based on a specified input operation associated with the entire region of a touchscreen display.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
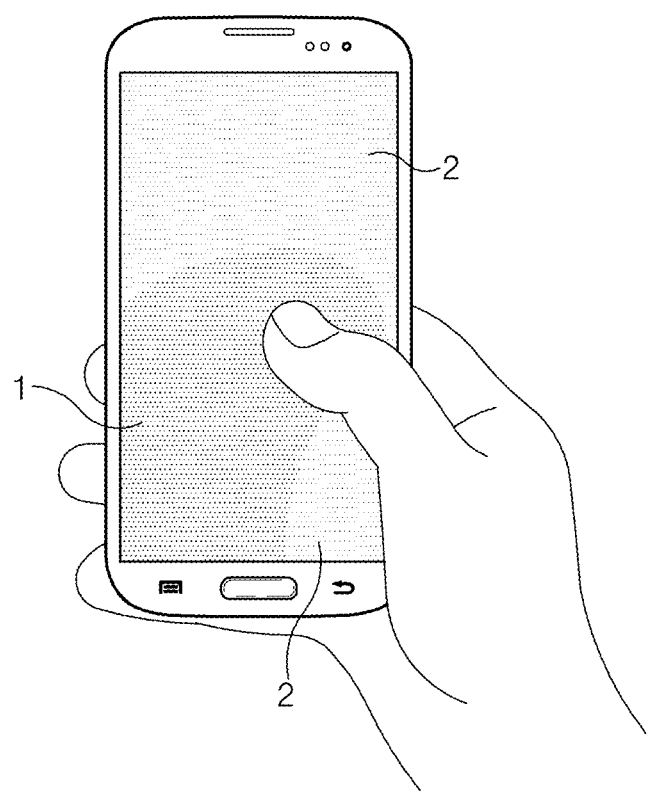
FIG. 1 illustrates a view of an operating environment of an electronic device according to an embodiment.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are disclosed with reference to the accompanying drawings. However, the present disclosure is not intended to be limited by the disclosed embodiments and it is intended that the present disclosure covers all modifications, equivalents, and/or alternatives of the present disclosure provided they are within the scope of the appended claims and their equivalents.

The terms and words used in the following description and claims may not be limited to their dictionary meanings, but may be used by the inventor to enable a clear and consistent understanding of the present disclosure. Accordingly, it should be apparent to those skilled in the art that the following description of the various embodiments of the present disclosure is provided for illustration purpose only and not for the purpose of limiting the present disclosure as defined by the appended claims and their equivalents.

It is to be understood that the singular forms "a," "an," and "the" include the plural thereof unless the context clearly dictates otherwise. Thus, for example, a reference to "a component surface" may include one or more of such surfaces.

The term "include," "comprise," and "have", or "may include," or "may comprise," and "may have" used herein indicates disclosed functions, operations, or existence of elements but does not exclude other functions, operations or elements.

For example, the expressions "A or B," or "at least one of A and/or B" may indicate A and B, A, or B. Thus, the expression "A or B" or "at least one of A and/or B" may indicate (1) at least one A, (2) at least one B, or (3) both at least one A and at least one B.

The terms such as "1st," "2nd," "first," "second," and the like used herein may be used to distinguish various different elements in the present disclosure, but are not intended to limit those elements. For instance, "a first user device" and "a second user device" may indicate different user devices regardless of order or importance. Accordingly, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In contrast, when a component (for example, a first component) is referred to as being "directly connected to" or "directly accessed by" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of," depending on the context. The term "configured to" may not necessarily indicate "specifically designed to" in terms of hardware. Instead, the expression "a device configured to" in some situations may indicate that the device, alone or in conjunction with another device, are "capable of." For example, the expression "a processor configured to perform A, B, and C" may indicate a dedicated processor (for example, an embedded processor) for performing A, B, and C operations or a general purpose processor (for example, a central processing unit (CPU) or application processor (AP)) that performs A, B, and C by executing at least one software program stored in a corresponding memory device.

Terms used in various embodiments of the present disclosure are used to describe certain embodiments of the present disclosure, but are not intended to limit the scope of other embodiments. Unless made clear by the context or indicated otherwise, all terms used herein may have the same meanings that are generally understood by a person skilled in the art, and should not be understood to have excessively formal meanings. In any case, even the terms specifically defined in the present specification are not intended to be interpreted as excluding embodiments of the present disclosure.

An electronic device according to various embodiments of the present disclosure may be a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may be an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In one or more embodiments of the present disclosure, the electronic device may be a home appliance. The smart home appliance may be, for example, a television (TV), a digital video/versatile disc (DVD) player, an audio player, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In other embodiments of the present disclosure, the electronic device may be a medical device (e.g., a portable medical measurement device, such as a blood glucose measuring device, a heart rate measuring device, a blood pressure measuring device, a body temperature measuring device, or the like, a magnetic resonance angiography (MRA) device, a magnetic resonance imaging (MRI) device, a computed tomography (CT) device, a medical scanner, an ultrasonic scanner, or the like), a navigation device, a global navigation satellite system (GNSS) device, an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to yet other embodiments of the present disclosure, the electronic device may be a part of furniture or a building/structure, an electronic board, an electronic signature receiving device, a projector, or a measuring instrument (e.g., a water meter, an electricity meter, a gas meter, a wave meter, or the like). The electronic device according to the present disclosure may be one or more combinations of the above-mentioned devices. The electronic device may also be a flexible device. The electronic device according to one or more embodiments of the present disclosure is not limited to the above-mentioned devices, and may include other electronic devices that are developed in the art.

Hereinafter, an electronic device according to one or more embodiments of the present disclosure will be described in more detail with reference to the accompanying drawings. The term "user" used herein may refer to a person who uses the electronic device or may refer to a device (e.g., an artificial intelligence electronic device) that uses the electronic device.

FIG. 1 illustrates a view of an operating environment of an electronic device according to an embodiment.

Referring to FIG. 1, when operating an electronic device 100, a user may grip the electronic device 100 with any one hand of a right hand or a left hand depending on an individual characteristic. In this case, the user may apply a user input (e.g., a touch, a drag, a swipe, a press, or the like) on a display of the electronic device 100 by using a specific finger (e.g., a thumb) that is relatively easy to move or is easy to approach the display.

The above-described one hand manipulation of the user is limited depending on the tendency of the large area display. For example, since a movement range associated with a user's thumb is limited, approach of the user on the display may be limited to a first region 1. As such, it may be difficult to manipulate, with one hand, a key (e.g., a hard key, a soft key, or the like) that may be disposed in a second area 2 not easy for the user to approach or may be disposed in a lower end region of the electronic device 100.

With regard to the above description, the electronic device 100 according to an embodiment of the present disclosure may activate, for example, a virtual function key, which is capable of performing a function similar to a hard key or a soft key, in response to a user input (e.g., a touch of a specified pressure intensity or more) over the entire region of the display. Various embodiments in which a function (e.g., a screen change or the like) of the electronic device 100 is controlled by using the virtual function key will be described below.

Figure 2:
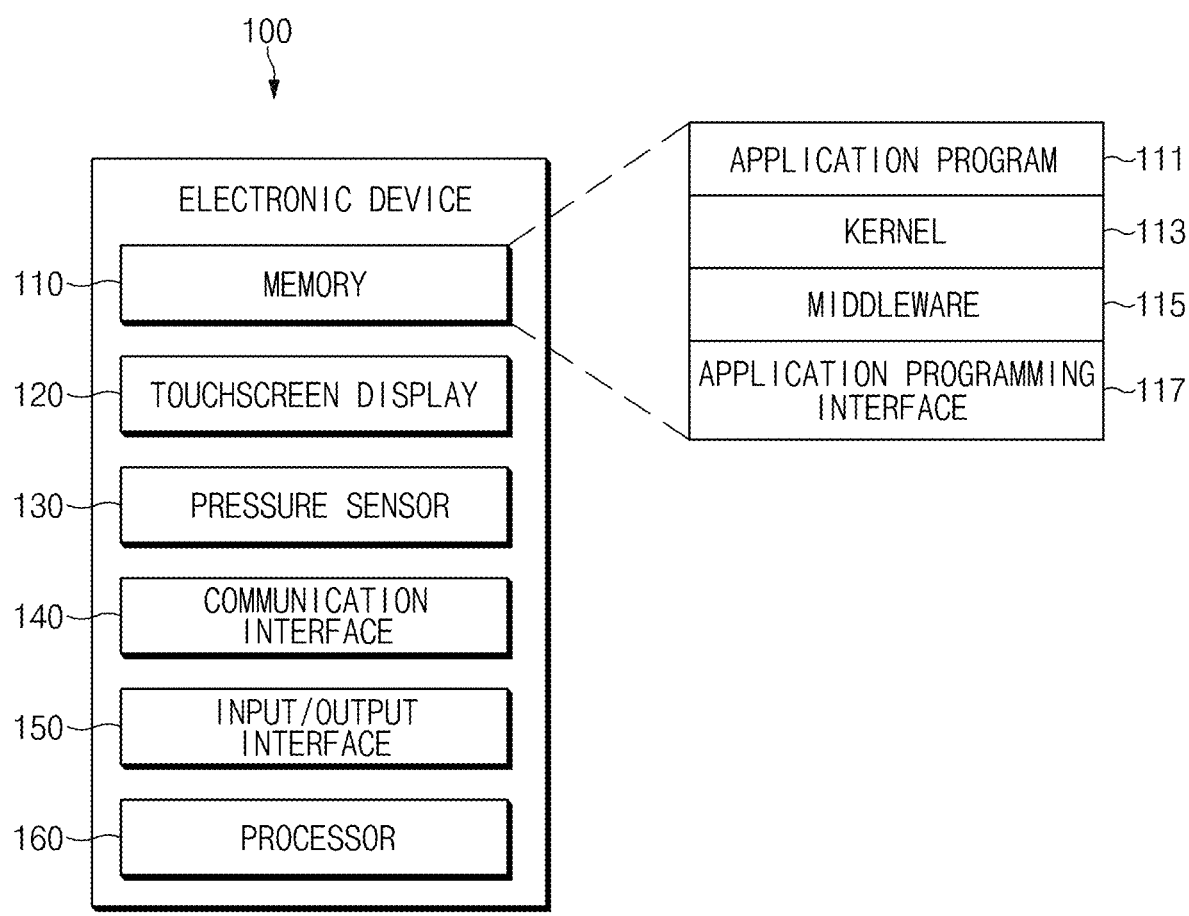
FIG. 2 illustrates a view of a configuration of the electronic device according to an embodiment.

FIG. 2 illustrates a view of a configuration of an electronic device according to an embodiment.

Referring to FIG. 2, the electronic device 100 may include a memory 110, a touchscreen display 120, a pressure sensor 130, a communication interface 140, an input/output interface 150, and a processor 160. In an embodiment, the electronic device 100 may not include at least one of the above-described elements or may further include any other element(s).

The memory 110 may store a command or data associated with at least one other element of the electronic device 100. For example, the memory 110 may store information data (e.g., a pressure intensity of an input, an input duration time, input occurrence coordinates, or the like) associated with a user input (e.g., a touch, a drag, a swipe, a press, or the like) applied to the touchscreen display 120.

Also, the memory 110 may store at least one program associated with any screen (or a graphical user interface) to be output by the touchscreen display 120. The program may include, for example, an application program 111, a kernel 113, a middleware 115, an application programming interface (API) 117, and the like. At least a part of the kernel 113, the middleware 115, or the API 117 may be called an "operating system (OS)".

The kernel 113 may control or manage system resources (e.g., the memory 110, the processor 160, and the like) needed to execute operations or functions of other programs (e.g., the application program 111, the middleware 115, and the API 117). Also, the kernel 113 may provide an interface that allows the application program 111, the middleware 115, or the API 117 to access an individual element of the electronic device 100 for control or management of system resources (e.g., the memory 110, the processor 160, and the like).

The middleware 115 may perform, for example, a mediation role such that the application program 111 or the API 117 communicates with the kernel 113 to transmit or receive data. Also, the middleware 115 may process one or more task requests received from the application program 111 depending on priorities. For example, the middleware 115 may assign the priority, which makes it possible to use a system resource (e.g., the memory 110, the processor 160, or the like) of the electronic device 100, to at least one of the application program 111. The middleware 115 may perform scheduling or load balancing on the one or more work requests depending on priorities.

The API 117 that is an interface for controlling, at the application program 111, a function provided from the application program 111 or the middleware 115 may include, for example, at least one interface or function (e.g., an instruction) for a file control, a window control, image processing, a character control, or the like.

In various embodiments, the memory 110 may include at least one of a volatile memory (e.g., a dynamic random access memory (DRAM), a static RAM (SRAM), or a synchronous DRAM (SDRAM)), a nonvolatile memory (e.g., a one-time programmable read only memory (OT-PROM), a programmable ROM (PROM), an erasable and programmable ROM (EPROM), or an electrically erasable and programmable ROM (EEPROM)), a mask ROM, a flash ROM, or a flash memory.

The touchscreen display 120 may display a variety of contents (e.g., a text, an image, a video, an icon, a symbol, or the like). For example, the touchscreen display 120 may output relevant contents in response to a user input (e.g., a touch, a drag, a swipe, a hovering, or the like) or specified scheduling information.

In an embodiment, the touchscreen display 120 may output a virtual function key in a region to which a touch input of a specified pressure intensity or more is applied. In this regard, the touchscreen display 120 may include a touch sensor or a touch panel. In an embodiment, the virtual function key that is an object for operating a function of the electronic device 100 may be configured to support an operation of a common function with respect to any screens (or a graphical user interface and the like) output by the touchscreen display 120. For example, the virtual function key may support the same function in a screen of a first application program and a screen of a second application program in response to a user manipulation. Alternatively, the virtual function key may be configured to operate depending on a priority regardless of a screen (or a graphical user interface) that the touchscreen display 120 outputs. For example, in the case where the virtual function key is output, at least one function associated with a screen (or a graphical user interface) output by the touchscreen display 120 may be deactivated, and at least one function available using the virtual function key may be activated.

The pressure sensor 130 may sense pressure applied on the touchscreen display 120 by the user or a touch pen. In this regard, the pressure sensor 130 may include at least one electrode layer and may sense pressure based on a change in a physical quantity (e.g., a voltage, capacitance, or the like) with respect to the at least one electrode layer. In an embodiment, the pressure sensor 130 may have the size that is the same as or corresponds to the size of the entire region of the touchscreen display 120. Alternatively, the pressure sensor 130 may have the size that is the same as or corresponds to the area of a region (e.g., 1 of FIG. 1) of the touchscreen display 120, which is easy for the user to approach.

The communication interface 140 may connect to a specified network through wired or wireless communication to establish communication between the electronic device 100 and at least one external device. The network may include at least one of a computer network (e.g., a local area network (LAN) or a wide area network (WAN)), an Internet, or a telephone network.

In various embodiments, the wireless communication may use at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include short range communication such as wireless fidelity (Wi-Fi), Bluetooth, near field communication (NFC), magnetic stripe transmission (MST), or the like.

The input/output interface 150 may transfer a command or data input from a user or another external device to other elements of the electronic device 100. Also, the input/output interface 150 may output a command or data received from other elements of the electronic device 100 to the user or another external device.

The processor 160 may be electrically or operatively connected with one or more elements of the electronic device 100 and may perform a control operation, a communication operation, a data processing operation of elements. For example, based on information (e.g., input occurrence coordinates, an input duration time, or the like) about a touch input of the user, which has a specified pressure intensity or more, the processor 160 may output a virtual function key corresponding to the touch input. Also, the processor 160 may control other elements (e.g., the memory 110, the touchscreen display 120, and the like) of the electronic device 100 for the purpose of performing a function mapped onto the virtual function key in response to a user manipulation associated with the virtual function key. In an embodiment, the processor 160 may include at least one of a central processing unit (CPU), an application processor (AP), or a communication processor (CP).

Figure 3A:
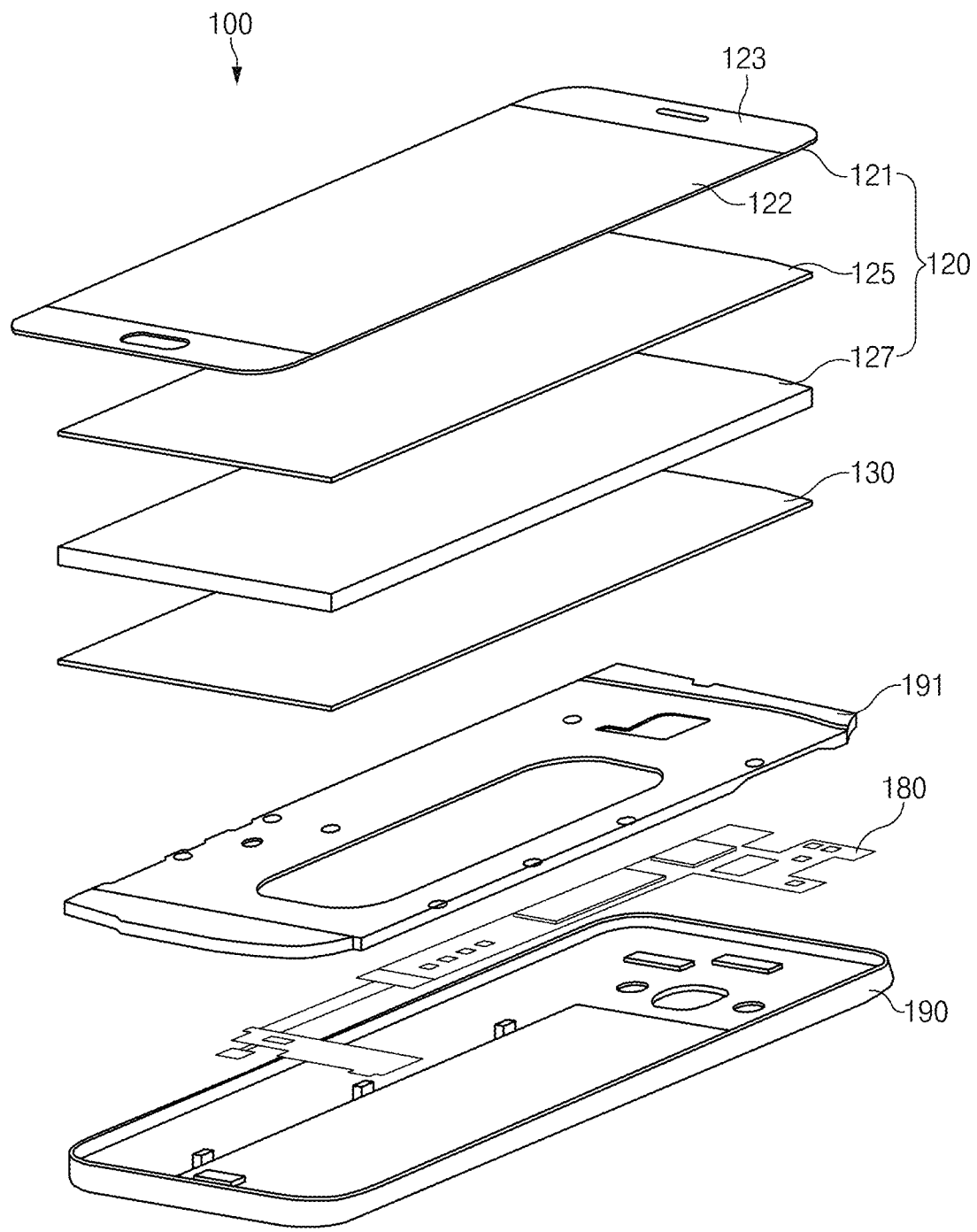
FIG. 3A illustrates a perspective view of the electronic device according to an embodiment.
Figure 3B:
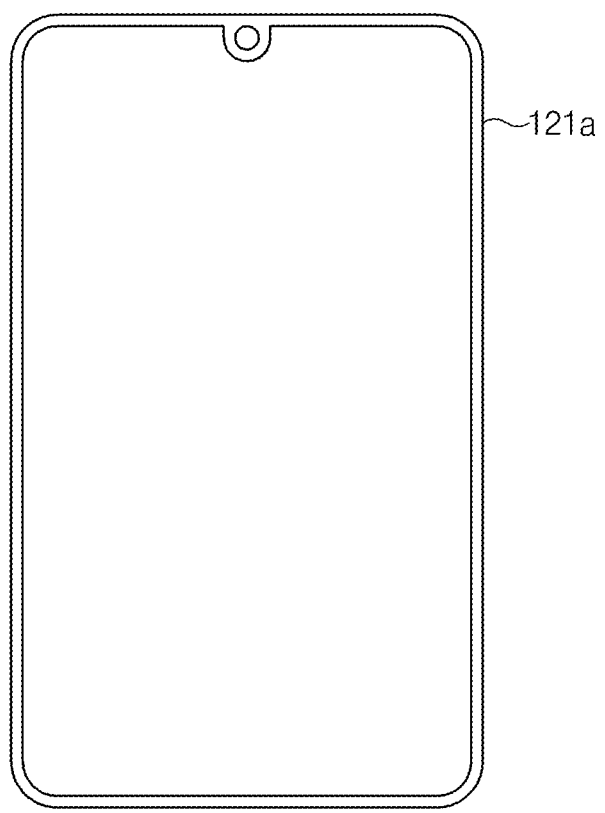
FIG. 3B illustrates a view of another shape of a cover glass according to an embodiment.
Figure 3C:
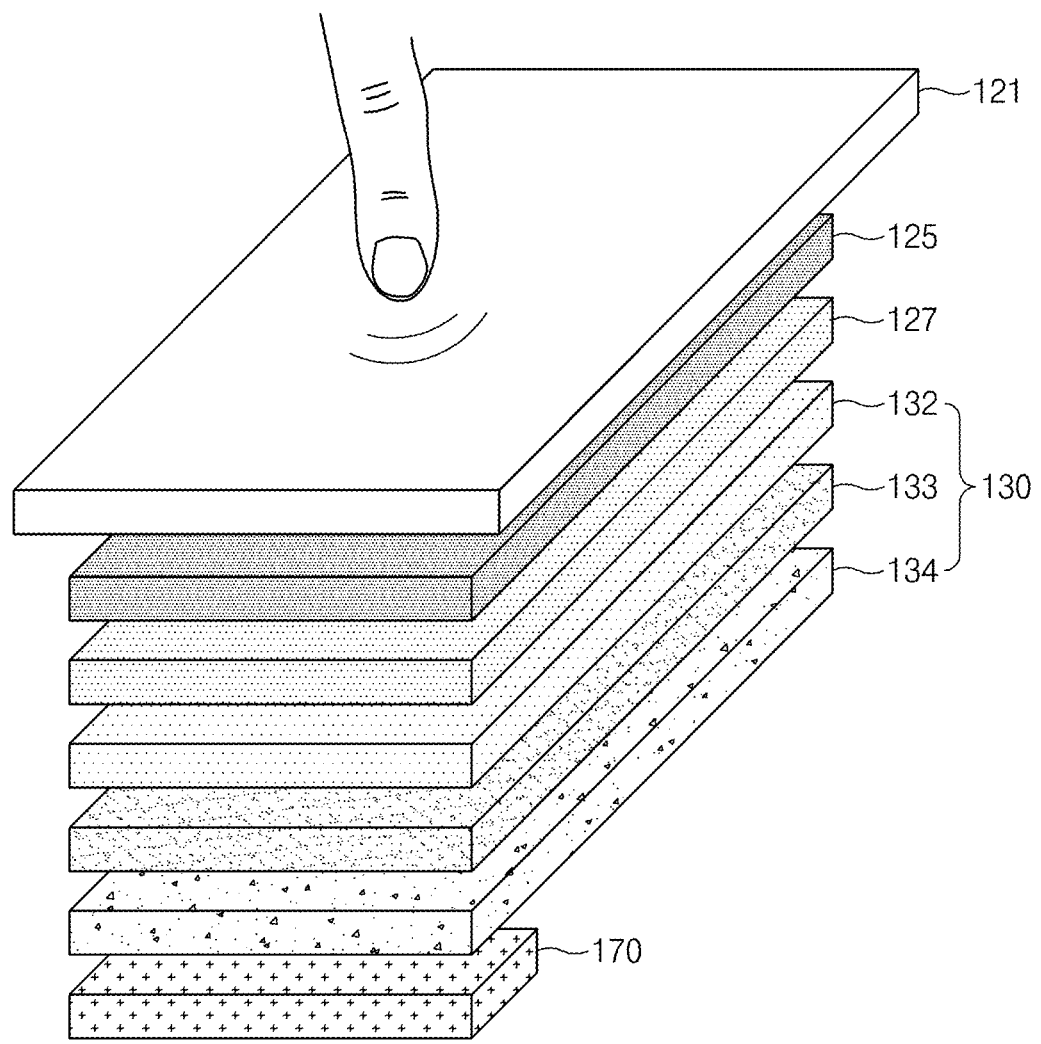
FIG. 3C illustrates a view of a stacked structure of a touchscreen display according to an embodiment.

FIG. 3A illustrates a perspective view of an electronic device according to an embodiment, FIG. 3B illustrates a view of another shape of a cover glass according to an embodiment, and FIG. 3C illustrates a view of a stacked structure of a touchscreen display according to an embodiment. In FIGS. 3A, 3B, and 3C, elements that are the same as or similar to the elements described with reference to FIG. 2 may be marked by the same reference numerals, and a duplicated description thereof will not be repeated here.

Referring to FIGS. 3A, 3B, and 3C, the electronic device 100 may further include at least one element associated with a stacked structure between elements or associated with forming the exterior of the electronic device 100, as well as the above-described elements. For example, the electronic device 100 may further include a support member 191, a printed circuit board 180, a housing 190, or the like.

The housing 190 may form the exterior of the electronic device 100 and may accommodate the above-described elements of the electronic device 100. In an embodiment, the housing 190 may include a lower surface facing in a first direction and at least one side surface extending from an edge of the lower surface at a specific angle (e.g., vertically). An upper end of the at least one side surface may be inward bent, for example. Alternatively, the housing 190 may include the lower surface, the at least one side surface, and an upper surface that is opposite to the lower surface and is connected with the upper end of the at least one side surface. For example, the specified area of the upper surface from the center may be opened. According to the above description, the housing 190 may include an inner space in which at least a partial region is opened.

In an embodiment, the touchscreen display 120 may include a cover glass 121, a touch panel 125 (or a touch sensor), and a display panel 127, with regard to performing a function.

The cover glass 121 may be disposed on an upper side of the display panel 127 and may transmit light generated by the display panel 127. Also, a user input (e.g., a touch, a drag, a swipe, a press, or the like) associated with operating or controlling a function of the electronic device 100 may be applied on the cover glass 121. In an embodiment, the cover glass 121 may be accommodated in the inner space of the housing 190, and at least a partial region thereof may be exposed through the opening region of the housing 190. At least a partial region of the cover glass 121 inserted into the inner space may be coupled or adhered to the housing 190 to finish the opening region of the housing 190.

In an embodiment, a printed member (not illustrated) may be attached on one surface of the cover glass 121. The printed member may include a transparent region of the specified area from the center and an opaque region corresponding to a periphery of the transparent region. According to the above description, a view region 122 corresponding to the transparent region and a blind region 123 corresponding to the opaque region may be formed in the cover glass 121.

Referring to FIG. 3B, the entire region of a cover glass 121a according to various embodiments may form the view region 122 with regard to implementing a full front display of the electronic device 100. In this case, the blind region and a specified function key (e.g., a home button or the like) may be excluded on the cover glass 121a.

The touch panel 125 (or a touch sensor) may detect a signal associated with a user input (e.g., a touch, a drag, a swipe, a press, or the like) applied to the cover glass 121 and may output an electrical signal as the detected signal. In this regard, the touch panel 125 may include at least one electrode layer and a control circuit. The control circuit may sense a change in a physical quantity (e.g., a voltage) between the electrode layers by a physical contact or a change in a physical quantity (e.g., capacitance) of the electrode layer by charge induction. The control circuit may detect coordinates or a duration time of a user input based on the change in the physical quantity sensed. In various embodiments, another element (e.g., the processor 160 of FIG. 2) of the electronic device 100 may substitute the above-described operation of the control circuit.

The display panel 127 may output contents corresponding to a user input or specified scheduling information. For example, the display panel 127 may output contents (or a screen or a graphical user interface including the contents) according to an operation of a virtual function key under control of the processor 160. In various embodiments, the display panel 127 may include the above-described touch panel 125 as a part thereof. In various embodiments, the display panel 127 may include at least one of a liquid crystal display (LCD), a light-emitting diode (LED) display, an organic LED (OLED) display, a microelectromechanical systems (MEMS) display, or an electronic paper display.

The pressure sensor 130 may sense pressure applied on the cover glass 121 by a user input (e.g., a touch, a drag, a swipe, a press, or the like). For example, the pressure sensor 130 may sense pressure in a way that is similar to a way to detect a user input of the touch panel 125. In this regard, referring to FIG. 3C, the pressure sensor 130 may include a first electrode layer 132, a second electrode layer 134 facing the first electrode layer 132, a dielectric layer 133 disposed between the first electrode layer 132 and the second electrode layer 134, and a control circuit (not illustrated). The control circuit may sense pressure or the intensity of pressure based on changes in distance and capacitance between the first electrode layer 132 and the second electrode layer 134, which occur due to pressure by the user input. In an embodiment, a haptic actuator 170 that outputs a specified feedback (e.g., vibration) in response to the pressure by the user input may be disposed on a lower side of the second electrode layer 134.

In an embodiment, the pressure sensor 130 may be disposed within the electronic device 100 with the specified area (or size). For example, the pressure sensor 130 may have the same or similar area (or size) as the cover glass 121 or 121a and may be disposed on a lower side of the touchscreen display 120. Accordingly, the pressure sensor 130 may sense pressure over the entire region of the cover glass 121. Alternatively, the pressure sensor 130 may be formed with the area (or size) similar to the area of the first region 1 described with reference to FIG. 1. In this case the pressure sensor 130 may be disposed under the touchscreen display 120 such that a region of the pressure sensor 130 corresponds to the first region 1.

The support member 191 (e.g., a bracket) may be disposed on a lower side of the touchscreen display 120 and may support or fix the touchscreen display 120. In various embodiments, the support member 191 may include a separate coupling member (e.g., a screw, a band, or the like) for connection with the touchscreen display 120. An adhesive material may be coated on at least a partial region of an upper surface of the support member 191, and the support member 191 may agglutinate the touchscreen display 120 based on the adhesive material.

At least one electronic part (e.g., a processor, a memory, a communication module, or the like) associated with operating a function of the electronic device 100 may be mounted on the printed circuit board 180. Also, at least one electronic component (e.g., a speaker, a camera, or the like), a circuit line associated with the electronic component, and the like may be mounted on the printed circuit board 180. In various embodiments, the printed circuit board 180 may be provided in plurality, and at least a part of the plurality of printed circuit boards 180 may be stacked and may be electrically connected to each other.

Figure 4:
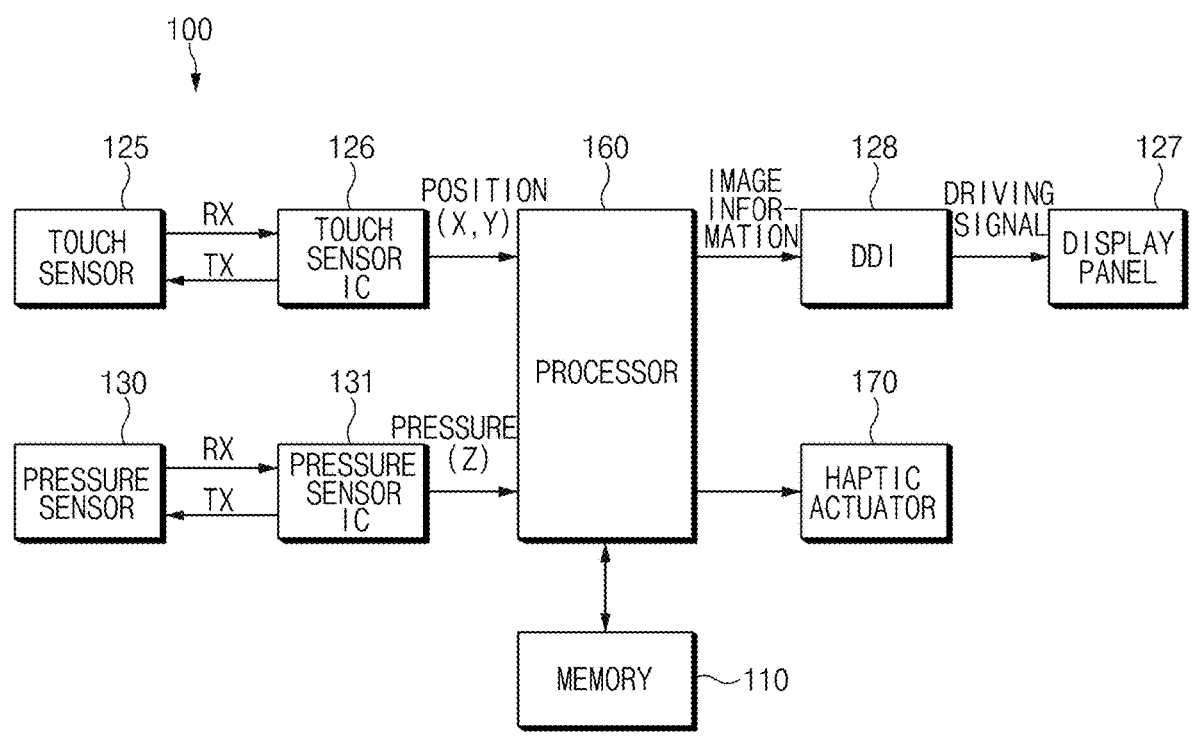
FIG. 4 illustrates a view of signal processing associated with some elements of the electronic device according to an embodiment.

FIG. 4 illustrates a view of signal processing associated with some elements of an electronic device according to an embodiment.

Referring to FIG. 4, the electronic device 100 may include at least one control circuit (e.g., a touch sensor IC 126, a display driver integrated circuit (DDI) 128, or a pressure sensor IC 131) or the haptic actuator 170 with regard to performing functions of the above-described elements.

In the touch sensor 125 (or a touch panel) according to an embodiment, a physical quantity (e.g., a voltage, capacitance, or the like) between a transmitter (Tx) electrode layer and a receiver (Rx) electrode layer may be changed by a user input. In this regard, the touch sensor IC 126 may sense the change in the physical quantity to calculate coordinates (X, Y) (or a location) of the user input or a duration time of occurrence of the user input and may transfer the calculation result to the processor 160.

The pressure sensor 130 according to an embodiment may sense pressure by the user input in a way similar or corresponding to the touch sensor 125. For example, a physical quantity (e.g., capacitance) between a Tx electrode layer and an Rx electrode layer in the pressure sensor 130 may be changed by the pressure, and the pressure sensor IC 131 may calculate pressure "Z" corresponding to the change in the physical quantity and may transfer the pressure "Z" to the processor 160.

The DDI 128 according to an embodiment may transfer a driving signal corresponding to image information received from the processor 160 to the display panel 127 at a specific frame rate. The display panel 127 may output the corresponding contents (or a screen or a graphical user interface including the contents) based on the driving signal transferred from the DDI 128.

The haptic actuator 170 according to an embodiment may provide a haptic feedback (e.g., vibration) on the electronic device 100 under control of the processor 160. For example, the haptic actuator 170 may output a haptic feedback at a time when a user input (e.g., a touch, a drag, a swipe, a press, or the like) is applied.

The processor 160 according to an embodiment may store data (e.g., coordinate data of a user input, occurrence duration time data of the user input, pressure data according to the user input, or the like) transferred from the touch sensor IC 126 or the pressure sensor IC 131 in the memory 110. In various embodiments, the processor 160 may substitute a function of the touch sensor IC 126 or the pressure sensor IC 131.

Figure 5A:
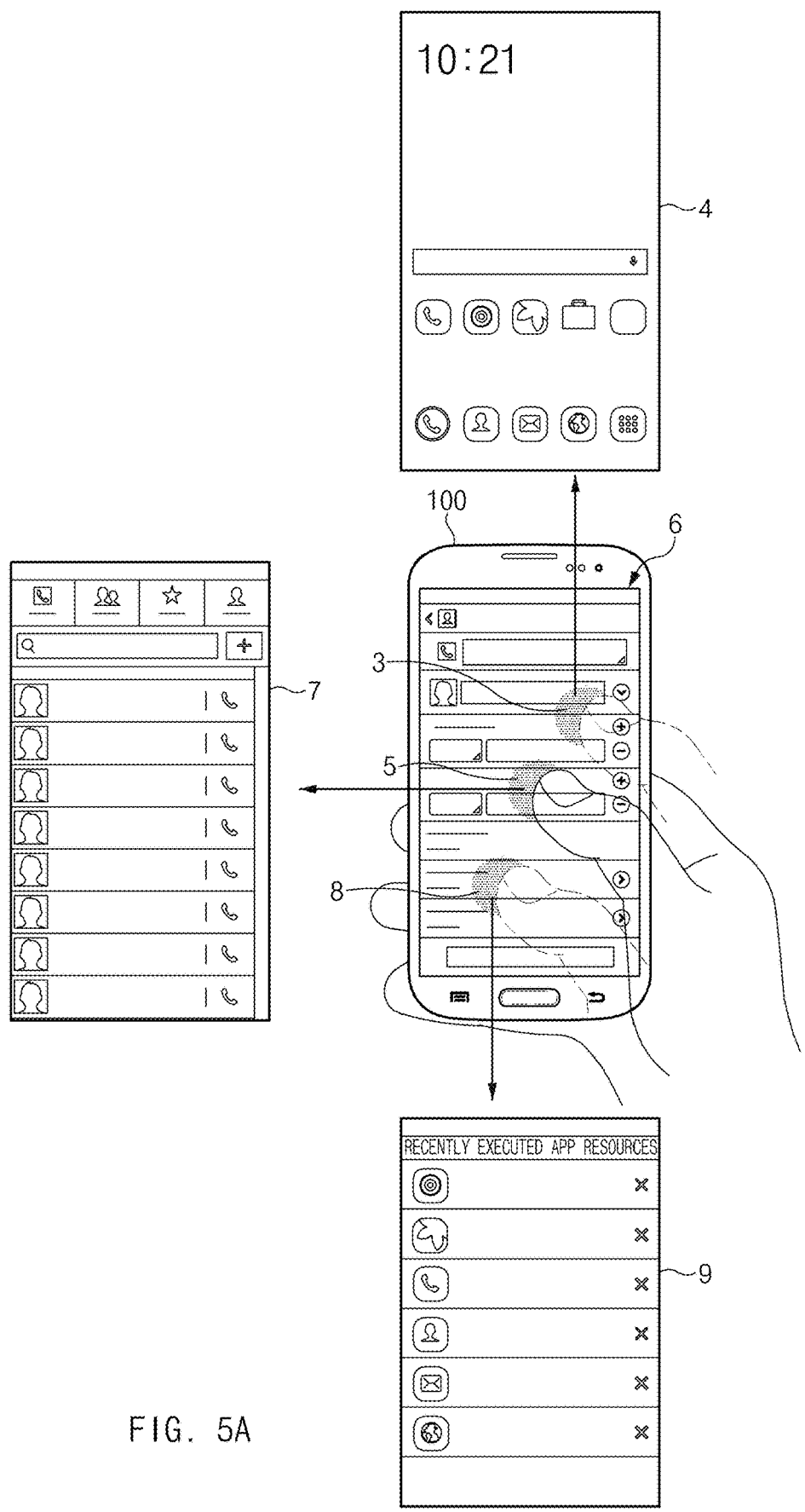
FIG. 5A illustrates a view of a first activation and utilization manner of a virtual function key according to an embodiment.

FIG. 5A illustrates a view of a first activation and utilization manner of a virtual function key according to an embodiment.

Referring to FIG. 5A, in an embodiment, a user may apply a user input (e.g., a touch) (hereinafter referred to as a "touch pressure event" in FIGS. 5A, 5B, and 5C) of a specified pressure intensity or more to any region on the cover glass 121 or 121*a* (refer to FIG. 3A or 3C). In this case, the processor 160 (refer to FIG. 2) of the electronic device 100 may analyze occurrence coordinates, an occurrence duration time, or the like of the touch pressure event. In an embodiment, in the case where the touch pressure event is maintained during a specified first time, the processor 160 may output and activate a first virtual function key 3 corresponding to the first time. Also, in the case where a release event occurs with regard to the touch pressure event, the processor 160 may control another element (e.g., the touchscreen display 120 of FIG. 2) such that a function corresponding to the first virtual function key 3 is performed.

In an embodiment, the first virtual function key 3 may include a function of changing a first screen 6 output by the touchscreen display 120 to a home screen 4 of the electronic device 100. As such, if the release event occurs after the touch pressure event occurs by the user input during the first time, the first screen 6 displayed in the touchscreen display 120 may be changed to the home screen 4 of the electronic device 100.

In an embodiment, in the case where the touch pressure event occurring in any region on the cover glass 121 or 121*a* is maintained during a specified second time, the processor 160 may output and activate a second virtual function key 5 corresponding to the second time. The second virtual function key 5 may include, for example, a function of changing the first screen 6 displayed in the touchscreen display 120 to a second screen 7 (e.g., a previous screen of the first screen 6) linked with the first screen 6. If a release event occurs with regard to a touch pressure event maintained during the second time, the processor 160 may control the touchscreen display 120 such that the first screen 6 displayed in the touchscreen display 120 is changed to the second screen 7 thus linked. In various embodiments, in the case where the first screen 6 corresponds to a home screen of the electronic device 100, the output and activation of the second virtual function key 5 may not appear.

In an embodiment, in the case where the touch pressure event is maintained in any region of the cover glass 121 or 121*a* during a specified third time, the processor 160 may output and activate a third virtual function key 8 corresponding to the third time. The third virtual function key 8 may include, for example, a function of changing the first screen 6 displayed in the touchscreen display 120 to a list screen 9 associated with at least one application program (or an application program being in background) recently executed in the electronic device 100.

In various embodiments, the first virtual function key 3, the second virtual function key 5, or the third virtual function key 8 may include a function of translucently changing the first screen 6 displayed in the touchscreen display 120 when the first time, the second time, or the third time elapses (or an output and activation time of a virtual function key). Alternatively, the first virtual function key 3, the second virtual function key 5, or the third virtual function key 8 may include the following function: if a release event occurs with regard to the touch pressure event, changing the first screen 6 from a translucent state to a transparent state and entering a screen (e.g., the home screen 4, the second screen 7, or the list screen 9) changed due to the corresponding virtual function key. Alternatively, the first virtual function key 3, the second virtual function key 5, or the third virtual function key 8 may include the following function: upon entering a screen changed due to the corresponding to virtual function key, the changed screen pushes the first screen 6 displayed in the touchscreen display 120 in one direction or is overlaid on the first screen 6. The above-described at least one function (e.g., a function of adjusting transparency of the first screen 6, a function associated with entering a changed screen, or the like) that the first virtual function key 3, the second virtual function key 5, or the third virtual function key 8 includes may be identically or similarly applied to an embodiment to be described with reference to FIGS. 5B and 5C.

In various embodiments, a region on the touchscreen display 120, in which the first virtual function key 3, the second virtual function key 5, or the third virtual function key 8 is output or activated, may be implemented with any region of the touchscreen display 120, not limited to the region illustrated in FIG. 5A.

Figure 5B:
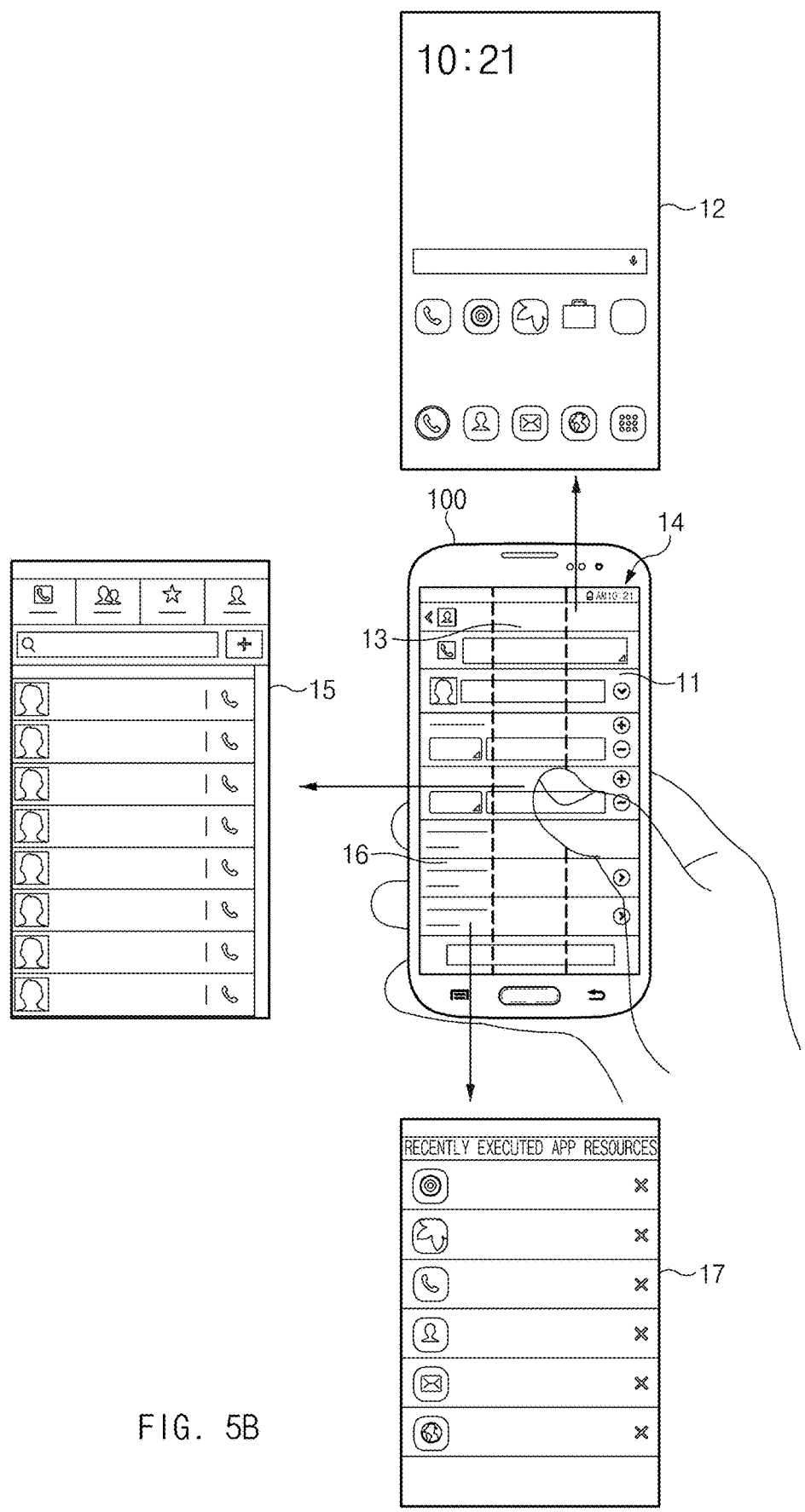
FIG. 5B illustrates a view of a second activation and utilization manner of a virtual function key according to an embodiment.

FIG. 5B illustrates a view of a second activation and utilization manner of a virtual function key according to an embodiment.

Referring to FIG. 5B, for example, the processor 160 (refer to FIG. 2) of the electronic device 100 may group coordinates included in the view region 122 (refer to FIG. 3A) of the cover glass 121 (refer to FIG. 3A) or a region of the cover glass 121*a* (refer to FIG. 3C) and may divide a first screen 14, which the touchscreen display 120 (refer to FIG. 2) outputs, into a first region 11, a second region 13, and a third region 16. In an embodiment, if a touch pressure event occurs in the first region 11 by a user, the processor 160 may output and activate the above-described first virtual function key 3 (refer to FIG. 5A). If a release event occurs with regard to the touch pressure event, the processor 160 may control a function of changing the first virtual function key 3 to a home screen 12 of the electronic device 100. If the touch pressure event occurs in the second region 13, the processor 160 may output and activate the above-described second virtual function key 5 (refer to FIG. 5A) and may change the first screen 14 being displayed in the touchscreen display 120 (refer to FIG. 2) to a second screen 15 (e.g., a previous screen of the first screen 14) linked with the first screen 14 in response to a release event associated with the touch pressure event. If the touch pressure event occurs in the third region 16, the processor 160 may output and activate the above-described third virtual function key 8 (refer to FIG. 5A). Depending on a release event associated with the touch pressure event, the processor 160 may change the first screen 14 being displayed in the touchscreen display 120 (refer to FIG. 2) to a list screen 17 specifying at least one application program (e.g., an application program being in background) recently executed.

Figure 5C:
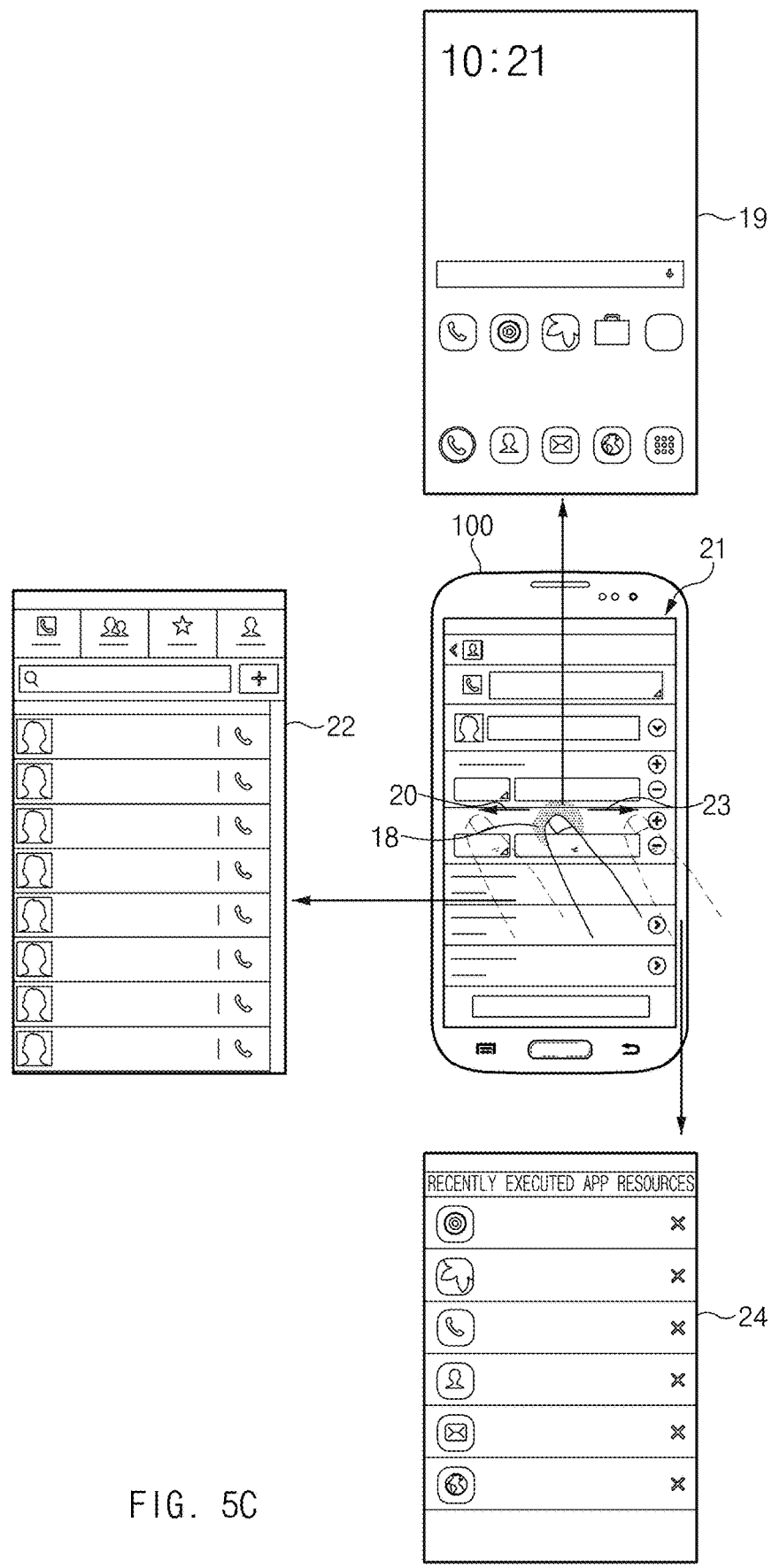
FIG. 5C illustrates a view of a third activation and utilization manner of a virtual function key according to an embodiment.

FIG. 5C illustrates a view of a third activation and utilization manner of a virtual function key according to an embodiment.

Referring to FIG. 5C, a touch pressure event may occur in any region of the cover glass 121 (refer to FIG. 3A) or 121*a* (refer to FIG. 3C) by a user input during a specified first time. In this case, the processor 160 may output and activate a first virtual function key 18 corresponding to the first time. In response to a release event associated with the touch pressure event, the processor 160 may control a function of the first virtual function key 18, that is, a change to a home screen 19 of the electronic device 100.

In an embodiment, the touch pressure event may be a swipe event of a first speed or higher, which occurs in a first direction 20. In this case, the processor 160 may output and activate the second virtual function key 5 (refer to FIG. 5A) in response to the swipe event. In the case where a release event occurs with regard to the swipe event of the first direction 20, the processor 160 may control the touchscreen display 120 such that there is performed a function (a function of changing a first screen 21 being displayed in the touchscreen display 120 (refer to FIG. 2) to a second screen 22 corresponding to a previous screen of the first screen 21) that the second virtual function key 5 supports.

Alternatively, if the touch pressure event is a swipe event occurring in a second direction 23 different from the first direction 20, the processor 160 may output and activate the third virtual function key 8 (refer to FIG. 5A). In response to a release event occurring with regard to the swipe event of the second direction 23, the processor 160 may control the touchscreen display 120 such that there is performed a function (a function of changing the first screen 21 being displayed in the touchscreen display 120 (refer to FIG. 3) to a list screen 24 specifying a recently executed application program (or an application program being in background) that the third virtual function key 8 supports.

In various embodiments, a virtual function key above described with reference to FIG. 5A, 5B, or 5C may be configured to support an operation of a function of the virtual function key in common with respect to the at least one application program 111 (refer to FIG. 2) mounted or installed in the electronic device 100 (or with respect to an execution screen of an application program). Alternatively, the virtual function key may be configured to operate in preference to a function associated with a screen (or a graphical user interface) that the touchscreen display 120 outputs. For example, even though a touch input of a specified pressure intensity or more, which is made with respect to a screen that the touchscreen display 120 outputs, is set to a screen magnification function, the processor 160 may determine and process the touch input of the specified pressure intensity or more as an operation associated with outputting and activating the virtual function key. In an embodiment, the user may set whether to process a function (e.g., a screen magnification function) associated with a screen, which the touchscreen display 120 outputs, in priority or whether to process outputting and activating of a virtual function key preferentially, through a user interface associated with a function or a system setting control of the electronic device 100.

Figure 6:
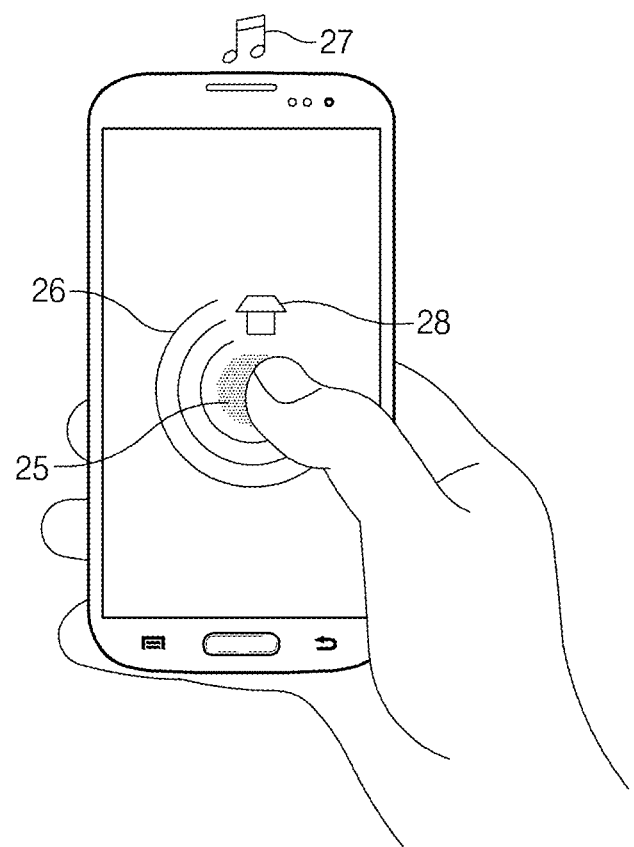
FIG. 6 illustrates a view of a feedback providing manner of the electronic device according to an embodiment.

FIG. 6 illustrates a view of a feedback providing manner of an electronic device according to an embodiment.

In various embodiments, with regard to outputting and activating the above-described virtual function key (e.g., 3, 5, or 8 of FIG. 5A), the electronic device 100 may provide a specified feedback. For example, in the case where a user input (e.g., a touch) of a specified pressure intensity or more is applied on the cover glass 121 or 121a (refer to FIG. 3A or 3C), the electronic device 100 may output a feedback functioning as a notification associated with at least one of the sense of touch, the sense of hearing, or the sense of sight. According to an embodiment, in the case where the processor 160 (refer to FIG. 2) of the electronic device 100 outputs and activates a virtual function key 25 corresponding to any one of the first virtual function key 3 (refer to FIG. 5A), the second virtual function key 5 (refer to FIG. 5A), or the third virtual function key 8 (refer to FIG. 5A) in response to the user input of the specified pressure intensity or more, the processor 160 may control the haptic actuator 170 (refer to FIG. 4) such that vibration 26 of a specified pattern is output in a surrounding region of the virtual function key 25 or the entire region of the electronic device 100. Alternatively, the processor 160 may control a speaker (not illustrated) mounted in the electronic device 100 to output specified notification sound 27 or may control the display panel 127 (refer to FIG. 3) to output a specified display object 28 (e.g., an icon, a text, a symbol, or the like). For example, the display object 28 may explicitly represent a function (e.g., a function of performing a change to a home screen) that the virtual function key 25 corresponding to any one of the first virtual function key 3, the second virtual function key 5, or the third virtual function key 8 supports. In various embodiments, the vibration 26, the notification sound 27, or the display object 28 may be output at the same time as an output time of the virtual function key 25 or within a specified time from the output time of the virtual function key 25. In various embodiments, the vibration 26, the notification sound 27, or the display object 28 may be output individually or in combination.

Figure 7:
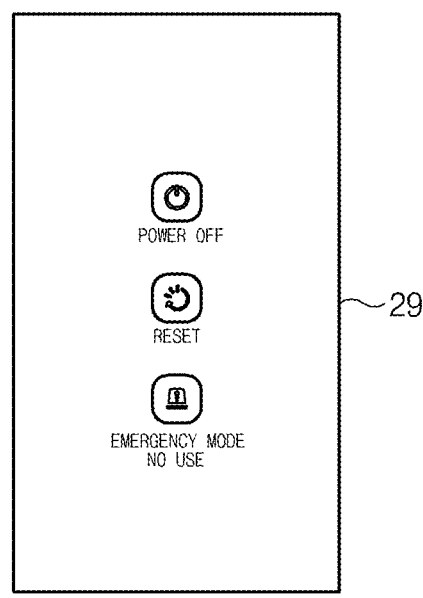
FIG. 7 illustrates a view of various utilization manners of a virtual function key according to an embodiment.

FIG. 7 illustrates a view of various utilization manners of a virtual function key according to an embodiment.

In an embodiment, a function of the above-described virtual function key 3, 5, or 8 (refer to FIG. 5A) may be changed under control of a user. As an example, in the case where the user changes a function of the third virtual function key 8 (refer to FIG. 5A), a function (i.e., a function of performing a change to a list screen associated with a recently executed application program (or an application program being in background) that the third virtual function key 8 supports may be changed to a specific function (e.g., a function of performing a change to a power off screen 29 of the electronic device 100) specified by the user. In various embodiments, a specific function that the user specifies may include at least one other function associated with an operation of the electronic device 100 without being limited to the function of performing a change to the power off screen 29.

According to various embodiments described above, an electronic device may include a housing including a first surface facing in a first direction and a second surface facing in a second direction that is opposite to the first direction, a display exposed through at least a part of the first surface, a pressure sensor configured to sense pressure of an external object applied on the display, a processor electrically connected with the display and the pressure sensor, and a memory electrically connected with the processor and configured to store a plurality of applications.

According to various embodiments, the memory may store instructions that, when executed, cause the processor to set a first region, a second region, and a third region extending substantially in parallel with each other on the display, the second region extending between the first region and the third region, to sense pressure applied to any one region of the first region, the second region, or the third region by using the pressure sensor, and to activate a function operating in common with respect to the plurality of applications if the sensed pressure exceeds a specified threshold value.

According to various embodiments, the display may include a first edge having a first length and extending in a third direction, a second edge having a second length shorter than the first length and extending in a fourth direction perpendicular to the third direction, a third edge having the first length and extending in parallel with the first edge, and a fourth edge having the second length and extending in parallel with the second edge, and the first region, the second region, and the third region may extend in the third direction.

According to various embodiments, the function may include at least one of a home key function, a back key function, or a list key function of recently used applications.

According to various embodiments, the instructions may cause the processor to activate the home key function when the processor senses the pressure from the second region.

According to various embodiments, the first region, the second region, and the third region may have substantially the same area.

According to various embodiments described above, an electronic device may include a housing including a first surface facing in a first direction and a second surface facing in a second direction that is opposite to the first direction, a display disposed between the first surface and the second surface, at least a part of the display being exposed through the first surface, a pressure sensor disposed between the display and the second surface and detecting pressure of an external object applied on the display, and a processor electrically connected with the display and the pressure sensor.

According to various embodiments, if a touch input of a specified pressure intensity or more is made by the external object in any region on the display, the processor may activate at least one virtual function key operating in common with respect to any screens to be displayed in the display.

According to various embodiments, the processor may perform a control associated with the virtual function key in preference to at least one system specified in the electronic device.

According to various embodiments, if a release event associated with the touch input of the specified pressure intensity or more occurs, the processor may change a first screen displayed in the display to a specified second screen with regard to performing a function of an activated virtual function key.

According to various embodiments, if the touch input of the specified pressure intensity or more is made in any region on the display during a specified first time, the processor may activate a first virtual function key corresponding to the first time.

According to various embodiments, if the touch input of the specified pressure intensity or more is made in a specified first region on the display, the processor may activate a first virtual function key corresponding to the first region.

According to various embodiments, if a swipe event of a specified first speed or higher facing a specified first direction follows the touch input of the specified pressure intensity or more in any region on the display, the processor may activate a first virtual function key corresponding to the first direction.

According to various embodiments, the processor may output a feedback associated with at least one of the sense of hearing, the sense of vision, or the sense of touch with regard to the activation of the at least one virtual function key.

According to various embodiments, the processor may change a function associated with the at least one virtual function key under control of a user.

Figure 8:
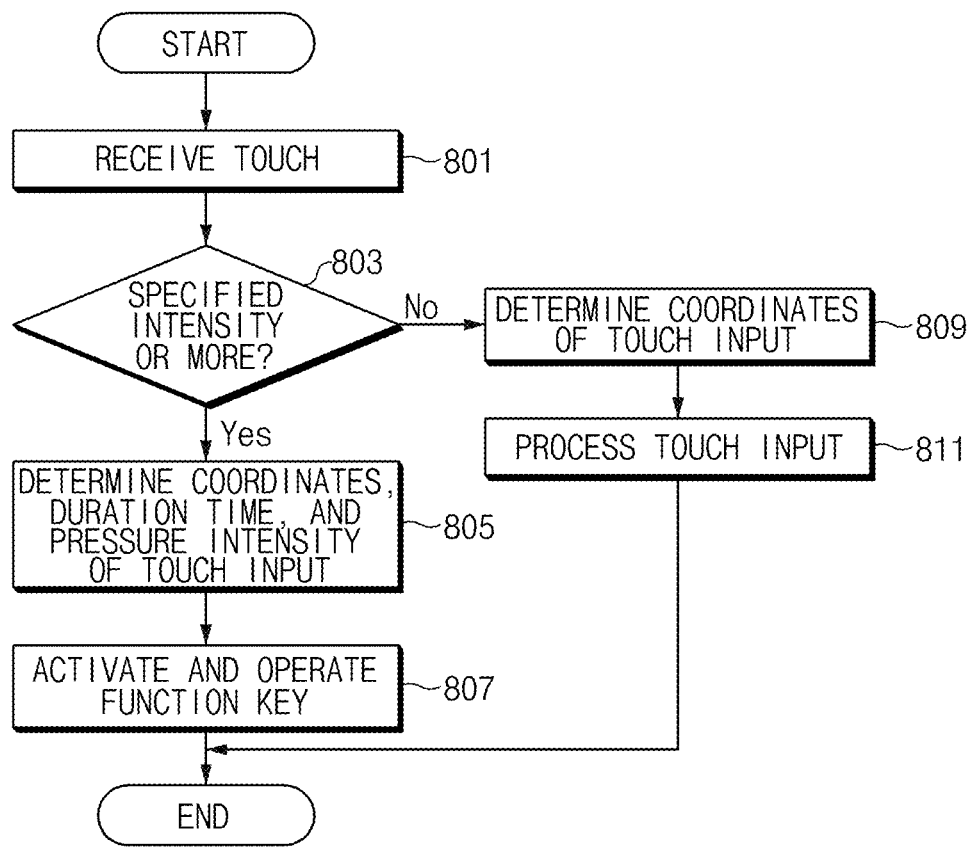
FIG. 8 illustrates a view of a touchscreen operating method of the electronic device according to an embodiment.

FIG. 8 illustrates a view of a touchscreen operating method of an electronic device according to an embodiment.

Referring to FIG. 8, in operation 801, an input by a body (e.g., a finger) of a user or a touch pen may be applied in any region or a specified specific region (e.g., 1 of FIG. 1) of a touchscreen display (or a cover glass).

In operation 803, a pressure sensor may sense the intensity of pressure according to the input based on at least one electrode layer and a control circuit. For example, the control circuit may sense pressure and the intensity of the pressure based on a change in a physical quantity (e.g., voltage or capacitance) of at least one electrode layer due to the input and may transfer information about the sensed result to a processor.

If the pressure by the touch input is not more than a specified pressure intensity, in operation 809 and operation 811, the processor may process a touch event corresponding to coordinates of the touch input provided from a touch panel.

Alternatively, if the pressure by the touch input is more than the specified pressure intensity, in operation 805 and operation 807, the processor may output and activate a specified virtual function key based on information about occurrence coordinates, an occurrence duration time, a pressure value, or the like of the touch input provided from the touch panel and/or a pressure sensor. For example, the processor may output and activate the virtual function key at a time when a touch input of a specified pressure intensity or more is applied or within a specified time from the applying. In an embodiment, in the case where a release event occurs with regard to the touch input of the specified pressure intensity or more, the processor may process a function that the activated virtual function key supports, based on a time during which the touch input is maintained. For example, the processor may change a first screen being displayed in the touchscreen display to any one of a home screen of an electronic device, a second screen (e.g., a previous screen of the first screen) linked with the first screen, or a list screen associated with an application program (e.g., an application program being in background) recently executed in the electronic device, depending on a time when the touch input is maintained.

In another embodiment, the processor may process a function that an activated virtual function key supports, depending on whether the touch input of the specified pressure intensity or more belongs to any region of a first region, a second region, and a third region specified on the touchscreen display. For example, the processor may change a first screen being displayed in the touchscreen display to any one of a home screen of an electronic device, a second screen (e.g., a previous screen of the first screen) linked with the first screen, or a list screen associated with an application program (e.g., an application program being in background) recently executed in the electronic device, depending on a region in which the touch input is applied and released.

In another embodiment, if the touch input of the specified pressure intensity or more is released after being maintained in any region of the touchscreen display during a specified time, the processor may change a first screen being displayed in the touchscreen display to a home screen of the electronic device. If a swipe event of a first speed or higher occurring in a specified first direction follows the touch input, the processor may change the first screen being displayed to the second screen (e.g., a previous screen of the first screen) linked with the first screen. Alternatively, if a swipe event of the first speed or higher occurring in a specified second direction follows the touch input, the processor may change the first screen being displayed to the list screen explicitly representing the application program (or the application program being in background) recently executed in the electronic device.

According to various embodiments described above, a display operating method of an electronic device may include receiving a touch input of a specified pressure intensity or more with respect to any region of the display, activating at least one virtual function key operating in common with respect to any screens to be displayed in the display, and if a release event associated with the touch input of the specified pressure intensity or more occurs, changing a first screen displayed in the display to a specified second screen with regard to performing a function of an activated virtual function key.

According to various embodiments, the receiving may include calculating at least one of occurrence coordinates or an event duration time associated with the touch input of the specified pressure intensity or more.

According to various embodiments, the activating may include activating, if the touch input of the specified pressure intensity or more is made during a specified first time, a first virtual function key corresponding to the first time.

According to various embodiments, the activating may include activating, if the touch input of the specified pressure intensity or more is made in a specified first region on the display, a first virtual function key corresponding to the first region.

According to various embodiments, the activating may include activating, if a swipe event of a specified first speed or higher facing a specified first direction follows the touch input of the specified pressure intensity or more, a first virtual function key corresponding to the first direction.

According to various embodiments, the activating may include outputting a feedback associated with at least one of the sense of hearing, the sense of vision, or the sense of touch within a specified time from the activation of the at least one virtual function key.

According to various embodiments, the method may further include changing a function associated with the at least one virtual function key in response to a control of a user.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a housing including a first surface facing in a first direction and a second surface facing in a second direction that is opposite to the first direction;
a display exposed through at least a part of the first surface;
a pressure sensor configured to sense pressure of an external object applied on the display;
a processor electrically connected with the display and the pressure sensor; and
a memory electrically connected with the processor and configured to store a plurality of applications,
wherein the memory stores instructions that, when executed, cause the processor to:
set a first region, a second region, and a third region extending substantially in parallel with each other on the display, the second region extending between the first region and the third region;
receive an input to set a priority for a plurality of functions in response to sensing pressure by the pressure sensor, wherein the processor prioritizes performing one of the plurality of functions based on the input;
sense pressure applied to any one region of the first region, the second region, or the third region by using the pressure sensor; and
if the sensed pressure exceeds a specified threshold value, activate at least one of the plurality of functions operating in common with respect to the plurality of applications and output a virtual function key in a region to which the input is applied, wherein the function is different according to the first region, the second region, or the third region in which the sensed pressure exceeding the specified threshold value is applied,
wherein at least one function associated with a screen or a graphical user interface output by the display is deactivated, and
wherein at least one function available using the virtual function key is activated.

2. The electronic device of claim 1, wherein the display includes a first edge including a first length and extending in a third direction, a second edge including a second length shorter than the first length and extending in a fourth direction perpendicular to the third direction, a third edge including the first length and extending in parallel with the first edge, and a fourth edge including the second length and extending in parallel with the second edge, and
wherein the first region, the second region, and the third region extend in the third direction.

3. The electronic device of claim 2, wherein the at least one of the plurality of functions includes at least one of a home key function, a back key function, or a list key function of recently used applications.

4. The electronic device of claim 3, wherein the instructions, when executed, further cause the processor to activate the home key function when the processor senses pressure from the second region.

5. The electronic device of claim 2, wherein the first region, the second region, and the third region have substantially a same area.

6. An electronic device comprising:
a housing including a first surface facing in a first direction and a second surface facing in a second direction that is opposite to the first direction;
a display disposed between the first surface and the second surface, at least a part of the display being exposed through the first surface;
a pressure sensor disposed between the display and the second surface and configured to detect pressure of an external object applied on the display; and
a processor electrically connected with the display and the pressure sensor,
wherein the processor is configured to:
receive an input to set a priority for a function or for at least one virtual function key in response to sensing pressure by the pressure sensor, wherein the processor prioritizes performing the function or the at least one virtual function key based on the input,
if a touch input of a specified pressure intensity or more is made by the external object in any region on the display, activate and display the at least one virtual function key operating in common with respect to any screens to be displayed in the display, wherein the at least one virtual function key is determined based on a duration time of the touch input, and
wherein the any screens to be displayed in the display is translucently changed while the at least one virtual function key is activated and output.

7. The electronic device of claim 6, wherein the processor is further configured to:
perform a control associated with the virtual function key in preference to at least one system specified in the electronic device.

8. The electronic device of claim 6, wherein the processor is further configured to:
  if a release event associated with the touch input of the specified pressure intensity or more occurs, change a first screen displayed in the display to a specified second screen with regard to performing a function of an activated virtual function key.

9. The electronic device of claim 6, wherein the processor is further configured to:
  if the touch input of the specified pressure intensity or more is made in any region on the display during a specified first time, activate and display a first virtual function key corresponding to the specified first time.

10. The electronic device of claim 6, wherein the processor is further configured to:
  if the touch input of the specified pressure intensity or more is made in a specified first region on the display, activate and display a first virtual function key corresponding to the specified first region.

11. The electronic device of claim 6, wherein the processor is further configured to:
  if a swipe event of a specified first speed or higher facing a specified first direction follows the touch input of the specified pressure intensity or more in any region on the display, activate and display a first virtual function key corresponding to the first direction.

12. The electronic device of claim 6, wherein the processor is further configured to:
  output a feedback associated with at least one of a sense of hearing, a sense of vision, or a sense of touch with regard to the activation of the at least one virtual function key.

13. The electronic device of claim 6, wherein the processor is further configured to:
  change a function associated with the at least one virtual function key under control of a user.

14. A display operating method of an electronic device, the method comprising:
  receiving a touch input of a specified pressure intensity or more with respect to any region of the display,
  activating and displaying at least one virtual function key operating in common with respect to any screens to be displayed in the display;
  receiving an input to set a priority for a function or for a virtual function key in response to sensing pressure by a pressure sensor, wherein performing the function or the virtual function key is prioritized based on the input; and
  if a release event associated with the touch input of the specified pressure intensity or more occurs, changing a first screen displayed in the display to a specified second screen with regard to performing a function based on activating the virtual function key, wherein the at least one virtual function key is determined based on a duration time of the touch input, and
  wherein the any screens to be displayed in the display is translucently changed while the at least one virtual function key is activated and output.

15. The method of claim 14, wherein the receiving includes:
  calculating at least one of occurrence coordinates or an event duration time associated with the touch input of the specified pressure intensity or more.

16. The method of claim 14, wherein the activating and displaying includes:
  if the touch input of the specified pressure intensity or more is made during a specified first time, activating and displaying a first virtual function key corresponding to the specified first time.

17. The method of claim 14, wherein the activating and displaying includes:
  if the touch input of the specified pressure intensity or more is made in a specified first region on the display, activating and displaying a first virtual function key corresponding to the specified first region.

18. The method of claim 14, wherein the activating and displaying includes:
  if a swipe event of a specified first speed or higher facing a specified first direction follows the touch input of the specified pressure intensity or more, activating and displaying a first virtual function key corresponding to the specified first direction.

19. The method of claim 14, wherein the activating and displaying includes:
  outputting a feedback associated with at least one of a sense of hearing, a sense of vision, or a sense of touch within a specified time from the activation of the at least one virtual function key.

20. The method of claim 14, further comprising:
  changing a function associated with the at least one virtual function key in response to a control of a user.

* * * * *